(12) United States Patent  
Honkala

(10) Patent No.: US 9,230,010 B2  
(45) Date of Patent: *Jan. 5, 2016

(54) TASK HISTORY USER INTERFACE USING A CLUSTERING ALGORITHM

(71) Applicant: Nokia Technologies Oy, Espoo (FI)

(72) Inventor: Mikko Johannes Honkala, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 14/516,538

(22) Filed: Oct. 16, 2014

(65) Prior Publication Data

US 2015/0040028 A1 Feb. 5, 2015

Related U.S. Application Data

(63) Continuation of application No. 12/340,851, filed on Dec. 22, 2008, now Pat. No. 8,874,491, which is a continuation-in-part of application No. 12/165,046, filed on Jun. 30, 2008, now abandoned.

(51) Int. Cl.
| | |
|---|---|
| *G06N 5/00* | (2006.01) |
| *G06F 1/00* | (2006.01) |
| *G06F 17/30* | (2006.01) |
| *G06F 3/0482* | (2013.01) |
| *G06N 99/00* | (2010.01) |

(52) U.S. Cl.
CPC ........ *G06F 17/30598* (2013.01); *G06F 3/0482* (2013.01); *G06F 17/30156* (2013.01); *G06N 99/005* (2013.01)

(58) Field of Classification Search
USPC ......................................................... 706/12  
See application file for complete search history.

(56) References Cited

U.S. PATENT DOCUMENTS

| | | |
|---|---|---|
| 8,001,527 B1 | 8/2011 | Qureshi et al. |
| 2005/0108350 A1 | 5/2005 | Dietz et al. |
| 2005/0210412 A1 | 9/2005 | Matthews et al. |
| 2005/0268301 A1 | 12/2005 | Kelley et al. |
| 2006/0017884 A1 | 1/2006 | Goodhill et al. |
| 2008/0250227 A1 | 10/2008 | Linderman et al. |
| 2009/0199128 A1 | 8/2009 | Matthews et al. |

FOREIGN PATENT DOCUMENTS

| | | |
|---|---|---|
| GB | 2419008 A | 4/2006 |
| WO | 0198881 A2 | 12/2001 |

OTHER PUBLICATIONS

Finan, T. "Developing Applications for Windows Mobile-Based Smartphones", Microsoft Pocket PC (General) Technical Articles, Jul. 2002, (Retrieved from the Interne Aug. 17, 2009).  
International Search Report for Application No. PCT/FI2009/050430, dated Sep. 17, 2009, 4 pages.

(Continued)

*Primary Examiner* — Jeffrey A Gaffin  
*Assistant Examiner* — Kalpana Bharadwaj  
(74) *Attorney, Agent, or Firm* — Alton & Bird LLP

(57) ABSTRACT

The aspects of the disclosed embodiments include clustering a set of discrete user interface states into groups; presenting the groups on a display of a device; and enabling selection of any state within a presented group, wherein selection of a state returns the user interface to the selected state.

20 Claims, 8 Drawing Sheets

(56) References Cited

OTHER PUBLICATIONS

Steinbach, et al., "A Comparison of Document Clustering Techniques", Department of Computer Science and Engineering, University of Minnesota; Technical Report #00-034 (dated 2000), pp. 1-20.

Popescul, et al., "Automatic Labeling of Document Clusters", University of Pennsylvania, Dated 2000, pp. 1-16.

Manning, et al., "Introduction to Information Retrieval" downloaded at http://nlp.standford/edu/IR-book, Cambridge University Press, dated 2008, pp. 1-584.

TASK HISTORY USER INTERFACE USING A CLUSTERING ALGORITHM

CROSS-REFERENCE TO RELATED APPLICATION

This application is a continuation of U.S. patent application Ser. No. 12/340,851 filed Dec. 22, 2008, which is a continuation-in-part application and claims the benefit of and priority to U.S. patent application Ser. No. 12/165,046 filed on Jun. 30, 2008, the disclosures of which are incorporated herein by reference in their entirety.

BACKGROUND

1. Field

The aspects of the disclosed embodiments generally relate to user interfaces and more particularly to task control and management in a multitasking environment.

2. Brief Description of Related Developments

In current systems, user multitasking is enabled by the use of multiple user-controlled windows. In a windowing system, the user handles the multitasking by opening and closing windows and applications. The burden of window management is left to the user, which is often unacceptable, especially in mobile environments. It would be advantageous to be able to perform multiple tasks in parallel without the need for the typical desktop paradigms of windows and applications or application bars.

SUMMARY

The aspects of the disclosed embodiments are directed to at least a system, method, apparatus, user interface and computer program product for clustering a set of discrete user interface states into groups, presenting the groups on a display of a device, and enabling selection of any state within a presented group, wherein selection of a state returns the user interface to the selected state.

BRIEF DESCRIPTION OF THE DRAWINGS

The foregoing aspects and other features of the embodiments are explained in the following description, taken in connection with the accompanying drawings, wherein.

DETAILED DESCRIPTION OF THE EMBODIMENT(S)

Figure 1:
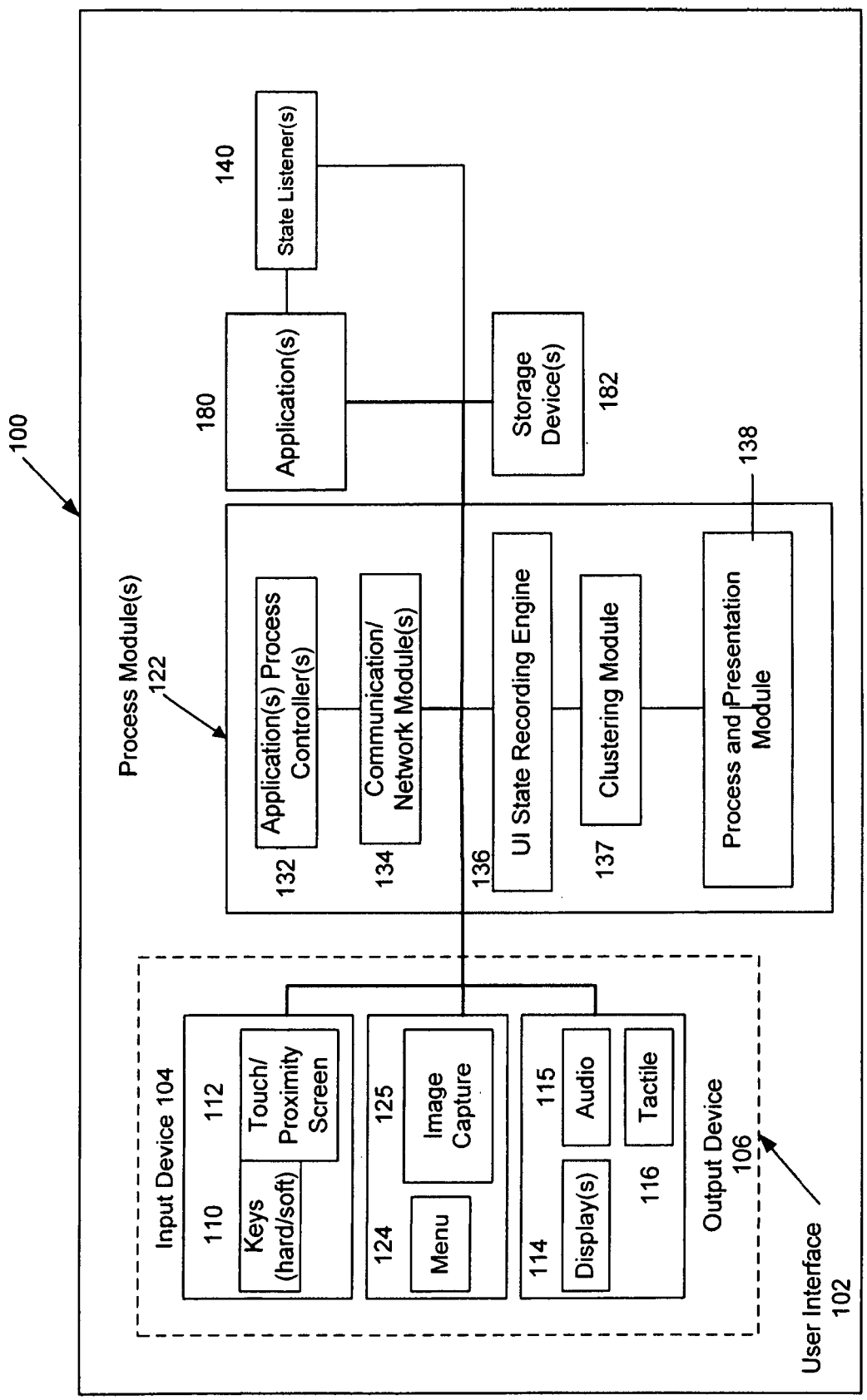
FIG. 1 shows a block diagram of a system in which aspects of the disclosed embodiments may be applied.

FIG. 1 illustrates one embodiment of a system 100 in which aspects of the disclosed embodiments can be applied. Although the disclosed embodiments will be described with reference to the embodiments shown in the drawings and described below, it should be understood that these could be embodied in many alternate forms. In addition, any suitable size, shape or type of elements or materials could be used.

The aspects of the disclosed embodiments are directed to using unsupervised machine learning methods, such as clustering, to support multitasking. Multitasking, as that term is used herein, will generally refer to ongoing parallel and sequential tasks. In one embodiment, the user can perform multiple tasks in parallel without the need for the typical desktop paradigms of windows and applications or application bars.

As an example, a user has an ongoing or long task, such as organizing an event. The task can include calling people, sending and receiving electronic messages, visiting web pages and scheduling meetings and appointments. These tasks are merely exemplary, and in alternate embodiments, any suitable task can be included. Furthermore, while each or any one of the above-listed tasks is ongoing, the user could also be receiving other calls or messages, browsing other websites or listening to music. The aspects of the disclosed embodiments will allow the user to continue with each of these tasks and in organized and intuitive manner. Each of the tasks can be carried on substantially simultaneously without the need for the user to explicitly tell the device how to organize the tasks.

In one embodiment, each visited or active state of the user interface is grouped in a meaningful way to allow the user to facilitate efficient multitasking without the need for window management or tasks. In one embodiment, the groups of user interface states are presented in a hierarchical fashion that allows the user to interact with each of the groups and each state within a group. The user can easily return back to an earlier state or task in any of the groups. One method of returning back to an earlier state is described in U.S. patent application Ser. No. 12/165,046.

A view can have one or more states and the user navigates between different states of the user interface. A state of the user interface can include a visited view, and each selection, modification, deletion or addition of an object belonging to the view by the user or the system can create a different state. For example, actions such as playing a song in a media player, typing text in an SMS editor, taking a picture from within a camera view or deletion of a message from the inbox, will each create or result in a state. A media player playing song after song, such as traversing a playlist, creates a new or different state for each song. Additionally, interaction with an object in a view can be recorded as a distinct state. For example, a user panning a map can be one view state of the user interface, and selecting or focusing on particular maps or geographic locations, such as "Helsinki" or "Espoo", can be other, distinct states of the user interface.

Referring to FIG. 1, the system 100 of the disclosed embodiments can generally include input device 104, output device 106, process module 122, applications module 180, and storage/memory device(s) 182. The components described herein are merely exemplary and are not intended to encompass all components that can be included in the system 100. The system 100 can also include one or more processors or computer program products to execute the processes, methods, sequences, algorithms and instructions described herein.

The input device(s) 104 is generally configured to allow a user to input data, instructions and commands to the system 100. In one embodiment, the input device 104 can be configured to receive input commands remotely or from another device that is not local to the system 100. The input device 104 can include devices such as, for example, keys 110, touch screen 112, menu 124, a camera device 125 or such other image capturing system. In alternate embodiments the input device can comprise any suitable device(s) or means that allows or provides for the input and capture of data, information and/or instructions to a device, as described herein. The output device 106 is configured to allow information and data to be presented to the user via the user interface 102 of the system 100 and can include one or more devices such as, for example, a display 114, audio device 115 or tactile output device 116. In one embodiment, the output device 106 can be configured to transmit output information to another device, which can be remote from the system 100. While the input device 104 and output device 106 are shown as separate devices, in one embodiment, the input device 104 and output device 106 can be combined into a single device, and be part of and form, the user interface 102. The user interface 102 can be used to receive and display information pertaining to content, objects and targets, as will be described below.

The process module 122 is generally configured to execute the processes and methods of the disclosed embodiments. The application process controller 132 can be configured to interface with the applications module 180, for example, and execute applications processes with respects to the other modules of the system 100. In one embodiment the applications module 180 is configured to interface with applications that are stored either locally to or remote from the system 100 and/or web-based applications. The applications module 180 can include any one of a variety of applications that may be installed, configured or accessed by the system 100, such as for example, office, business, media players and multimedia applications, web browsers and maps. In alternate embodiments, the applications module 180 can include any suitable application. The communication module 134 shown in FIG. 1 is generally configured to allow the device to receive and send communications and messages, such as text messages, chat messages, multimedia messages, video and email, for example. The communications module 134 is also configured to receive information, data and communications from other devices and systems.

In one embodiment, the aspects of the disclosed embodiments provide a user interface state recording engine or state library 136. The state library 136 is configured to track application states and forces the system 100 to return to a certain state from a current state depending upon a received input or request. In one embodiment, the state library 136 receives state information from the state listener(s) 140. The state listener(s) 140 is generally configured to identify a state of the user interface and create a link, such as for example a hypertext link, related to the state, which can be recorded in the state library 136. Although a hypertext link will be generally referred to herein, in alternate embodiments, any suitable mechanism for providing an identifier and link to a specific state can be utilized, other than including a hypertext link. The state listener 140, which in one embodiment can also include a state manager, in conjunction with the state library 136, can identify, monitor and track application states, and state changes, as well as respond to state change requests.

In one embodiment, the state library 136 can comprises a database, which records all discrete states the user visits. For each state, various details pertaining to the state can be recorded. For example, these details can include title, icon, preview screen shot, related objects, referrer state and view identifier. Other information might include context information such as location and time. In alternate embodiments any suitable information related to a state can be included, some of which are described in U.S. patent application Ser. No. 12/165,046.

The system 100 can also include a clustering module 137. The clustering module 137 is generally configured to group or cluster the visited user interface states in a meaningful way to the user. In one embodiment, the cluster module 137 is configured to use unsupervised clustering processes or algorithms and similarity measures to produce clusters or groups from the state history data maintained by the state recording engine 136 and state listener 140.

The presentation module 138 is generally configured to present the groups to the user, and allow interaction by the user within the groups. The clustering module 137 is configured to provide the clusters or grouping data to the presentation module 138. The presentation module 138 is configured to sort, filter, summarize, present and handle the interaction with the groups and tasks. The tasks within a group are summarized and sorted, and each user interface state within the groups can be filtered. The interaction with the groups and states can include for example, returning back to an earlier state or task.

In one embodiment, the clustering process generally comprises unsupervised machine learning methods that are used to cluster a set of discrete user interface states into user-perceived tasks. The unsupervised clustering algorithms are used to create user-understandable groups (user tasks) from a list of user interface states. The groups can be overlapping in time. Any unsupervised clustering method can be used, such as for example, agglomerative clustering and bisecting K-means. Some descriptions of agglomerative clustering and K-means clustering can be found in the book entitled "Introduction to Information Retrieval", by Christopher D. Manning, Prabhakar Raghavan and Hinrich Schutze, Cambridge University Press. 2008, the disclosures of which is incorporated herein by reference in its entirety. In alternate embodiments, any suitable unsupervised clustering algorithm can be used other than including agglomerative clustering and bisecting K-means, including normal K-Means and variations, such as for example, K-Means++. It is a feature of the disclosed embodiments to create user-understandable groups from a list of user interface states.

Figure 2:
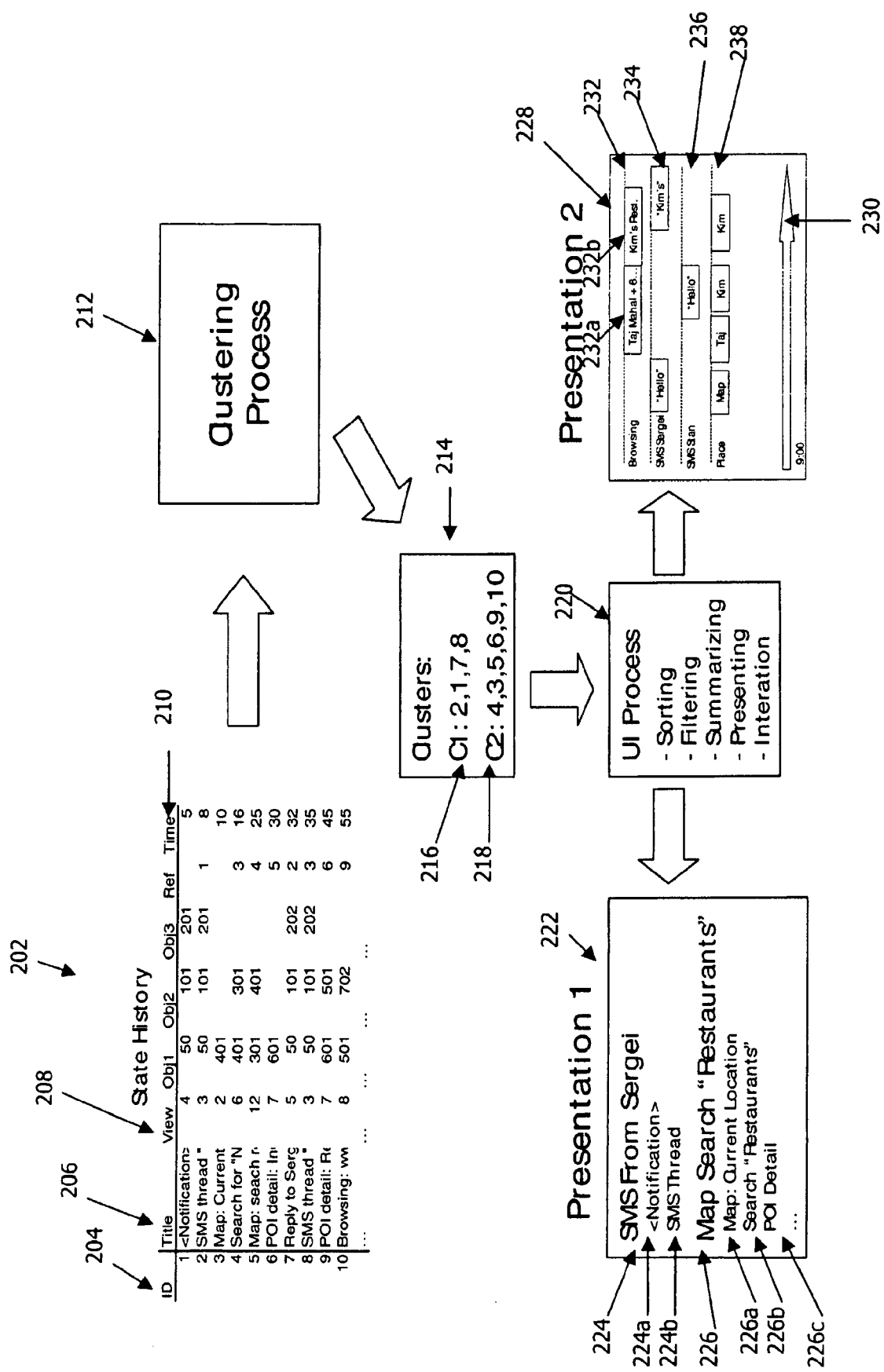
FIG. 2 illustrates an example of a process flow incorporating aspects of the disclosed embodiments.

Referring to FIG. 2, one example of a process including aspects of the disclosed embodiments is illustrated. As shown in FIG. 2, a state history 202 is assembled. The state history 202 includes an identification number 204, a title 206 of each user interface state, a view number 208 as well as other details 210 relating to the particular user interface state. The details 210 can also include, for example, a timestamp corresponding to when a state was created and accessed, objects that the view referenced, and a reference to a previous state (e.g. where the user navigated from into this state).

The clustering module 137 of FIG. 1 takes the state history data 202 as input and performs a clustering process 212. The clustering process 212 in this example produces two clusters 216 and 218, grouped by state ID number 204. Cluster C1 216 includes states 2, 1, 7 and 8 while cluster C2 includes states 4, 3, 5, 6, 9 and 10. The cluster data 214 is fed to the process and presentation module 138 of FIG. 1 where the clusters 216 and 218 are sorted, filtered, summarized, presented and enabled for interaction 220.

Figure 3:
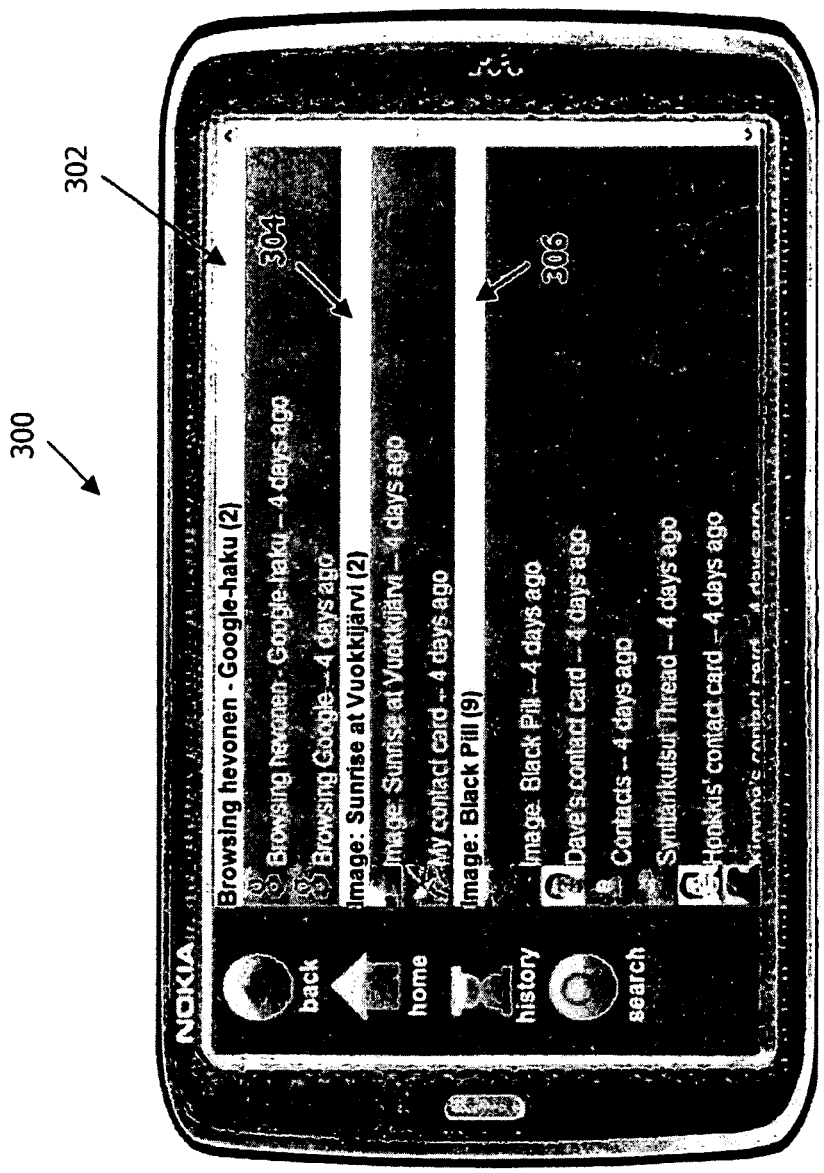
FIG. 3 illustrates a screen shot of an exemplary user interface incorporating aspects of the disclosed embodiments.

In one embodiment, as shown in FIG. 2, there can be different presentation types and different user interface presentation processes. As shown in FIG. 2, in one embodiment, the presentation 222 includes a hierarchical view. On a first level there are groups 224 and 226 and on a second level there are user interface states 224a, 224b and 226a-226c, related to the respective groups (tasks). The presentation 222 can be a master-detail view, an expandable list or the groups can act as links to a completely new page. FIG. 3 illustrates a screen shot of an exemplary user interface 300 incorporating aspects of a hierarchical presentation view. The group (task) titles 302-304 are highlighted in some fashion. When the titles 302-304 are activated, such as by selecting or activating a title, by for example using a pointing device, the respective group expands to show the contents of the selected group.

Another example of a presentation view is view 228 of FIG. 2. The presentation view 228 generally comprises a timelines of overlapping tasks based on the clustering algorithm output. In this presentation view 228, the ongoing parallel tasks 232-238 are presented graphically along a timeline 230. The presentation view 228 visualizes the time dependencies of the tasks. When the user selects a group, such as "Browsing" 232, the group expands and shows the states 232a and 232b within the group. Selection of either state 232a or 232b allows the user to return to that particular state. In one embodiment, the presentation view 228 may only allow the user to return to a latest state of each task when the user activates the task.

Hierarchical Agglomerative Clustering (HAC) is a method for clustering multivariate multidimensional data into hierarchical clusters. HAC takes a distance matrix as an input, does not require vector representation of the input data, and is rather straightforward to use with a heuristic distance measure, such as between UI states. Although standard single-link clustering is described herein, other clustering processes can be used as well, such as for example group-average. Any version of the algorithm can be used, e.g., efficientHAC or naiveHAC, which are described in the book by Christopher D. Manning, Prabhakar Raghavan and Hinrich Schutze, "Introduction to Information Retrieval", Cambridge University Press. 2008.

Figure 4:
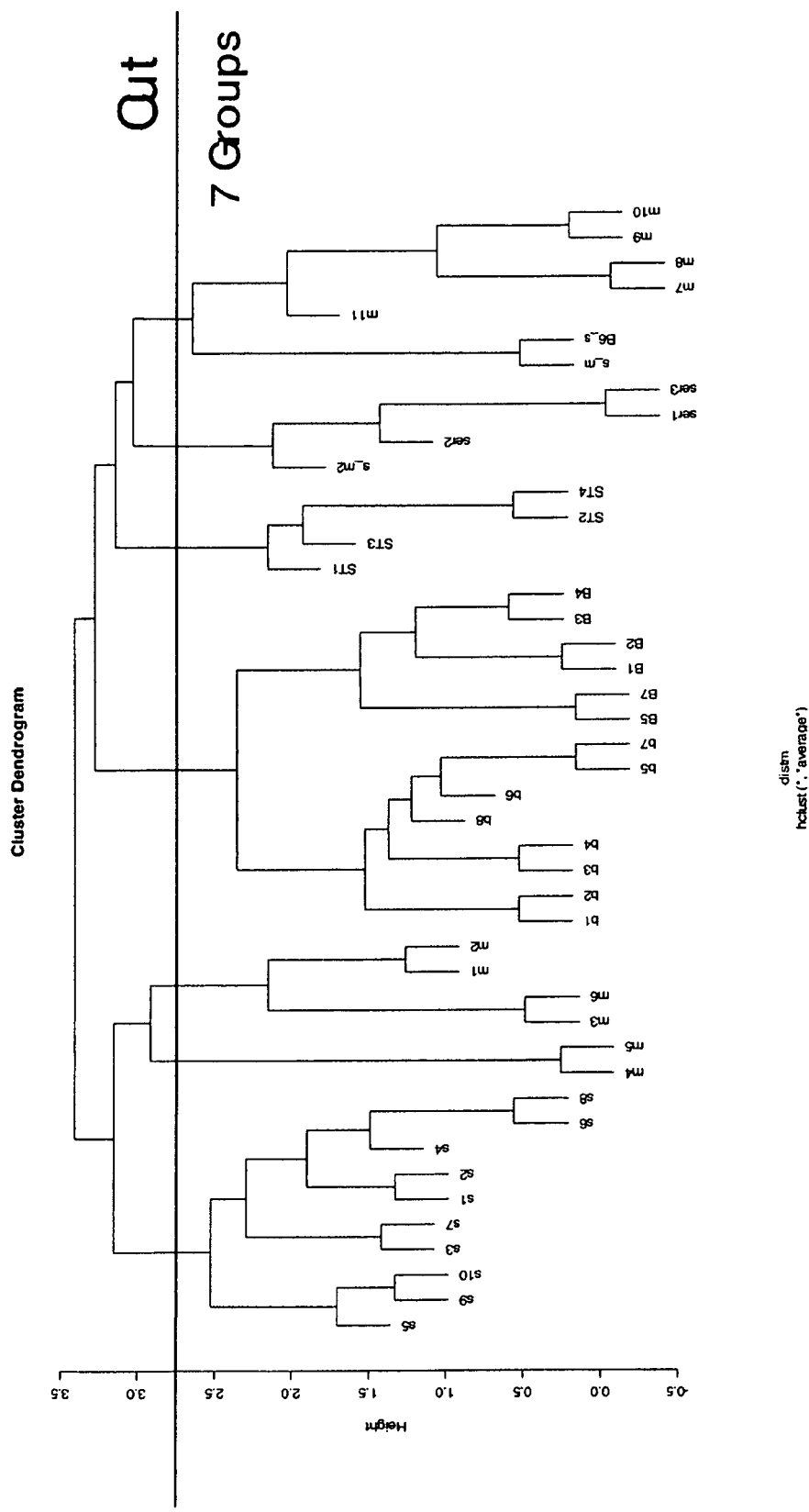
FIG. 4 is an exemplary cluster dendrogram that can be used in conjunction with aspects of the disclosed embodiments.

Referring to FIG. 4, which illustrates an example of a dendrogram of a HAC clustering of test data, to support adaptation, the cut distance needs to be determined dynamically in order to create adaptable clusters from the dendrogram. In the example of FIG. 4, the cut distance is 2.75, which produces 7 groups. It is possible to use statistics based methods to determine the optimal cut distance case by case. For instance, in the book by Christopher D. Manning, Prabhakar Raghavan and Hinrich Schutze, "Introduction to Information Retrieval", Cambridge University Press. 2008. The authors propose four options for cutting:

1. Cut at pre-specified level;
2. Cut where the gap between to successive combinations similarities is largest;
3. Minimize the residual sum of squares with the penalty A for groups. K=arg (K') min [RSS (K')+AK']; and
4. Use pre-specified number of clusters.

To support adaptation in the aspects of the disclosed embodiments, options 2 and 3 are preferable. Options 1 or 4 work in general, but they do not adapt to the users behavior.

In one embodiment, the clustering process can also include a similarity measure. The similarity measure can take into account common objects, views, time, navigation path (referrer), possible uniform resource locators (URL) and titles, and even content. The similarity of two states can take into account the following factors:

1. Common related objects
2. Common related object types
3. Common view
4. Common view types
5. Navigation path
6. Time difference
7. Context similarity (e.g., GPS or cell ID based location, time and recent history, for example)

Document analysis could also be used to look at similarities in the content level.

As an example, similarity(state1, state2) can be calculated e.g., using the formula:

Wobj*normalize(objectSimilarity(state1,state2))+
Wview*normalize(viewSimilarity(state1, state2))+
Wtime*normalize(abs(timediff(state2,state1)))+
Wctx*normalize(contextSimilarity(state2, state1)
Wnav*normalize(navigationSimilarity(state2,state1)+

Where normalize(x) represents normalization of values evenly into value scale 0 . . . 1, by looking at the whole data set.

The weights Wobj . . . Wnav are set manually based on experimentation, but are close to 1. They might be automatically set based on statistical variances in the data as well.

As noted above, bisecting K-Means clustering can be used instead of agglomerative clustering. A vector space representation of the discrete states must be created. K-Means clustering can be computationally more efficient than agglomerative clustering.

For adaptation, cluster cardinality can be determined using similar methods as described for the cut distance for agglomerative clustering. A few possible methods of finding the optimal cardinality is described in the book by Christopher D. Manning, Prabhakar Raghavan and Hinrich Schutze, "Introduction to Information Retrieval", Cambridge University Press. 2008.

The effect of the vector space representation of History States for Bisecting K-Means is the same as the similarity measure in Agglomerative Clustering above. After the vector representation, the distance between two states is straightforward. It is also possible to use cosine distance and document centroids as discussed e.g., by Steinbach et al. (Reference Michael Steinbach, et. al. "A Comparison of Document Clustering Techniques")

The aspects of the disclosed embodiments generally present a two-level hierarchy where on the first level there are groups and on the second level there are user interface states of each task. The sorting and filtering algorithm is generally configured to, for each cluster, remove duplicates so that only the latest version of a state is kept and sort the states inside the cluster in timestamp order, with the most recent first. The clusters can also be sorted based on a most recent state of each cluster so that the more recent cluster is first. In one embodiment, the groupings should adapt to the user's behavior, to some extent. For example, if a user is going through all contact persons in a social network, looking at the image they have shared, this can be considered one task, such as "Looking at Contact's Images". If the user looks at images of Person A and B only, then continues looking at B's messages, the system might show two groups, such as "Looking at images of A" and "Reading B's content."

The labeling and summarizing of groups should be meaningful to the user. The contents of the groups can be analyzed and human-understandable summaries of the groups represented. Summarizing options can include for example, latest state summarizing and commonality of a cluster. In one embodiment, in latest state summarizing, the cluster can be summarized by using the visual representation of the latest state in that cluster. For instance, if the cluster contains communications (SMSs, phone calls, emails) with a contact person A, the latest activity would be shown as the cluster title (E.g., "Made a phone call to A").

When summarizing by the commonality of a cluster, a few of the commonalities in a cluster are picked and that information is used to summarize the cluster. Statistical methods can also be used here. For instance, the frequency of objects, views, time, and other terms can be computer, and a few of the more frequent ones can be shown. It is also possible to do more advanced statistical processing. For example, if the cluster contains communications (SMSs, phone calls, emails) with a contact person A, the cluster title would be "Communications with A".

Some clustering mechanisms produce hierarchical clusters in the form of a dendrogram, such as that shown in FIG. 4. The dendrogram can be used to produce the cluster titles using the following algorithm (from the paper "Automatic Labeling of Document Clusters", by Popescui and Ungar).

Starting from the root node of the dendrogram (the node containing all groups) for each node test statistically which are the items (objects, views, time. etc.) that are equally likely to occur in any of the children of the current node. They are the labels of this node. Remove them from all child nodes.

Use the node labels one or two levels down to describe the current group. (e.g., "Browsing" could be the first level. The second could be "Wikipedia".) This way items, which are common to the whole test set, and hence do not describe single groups well, are excluded from the group/labels summaries, and the commonalities of those groups are used.

The timeline user interface of presentation 228 of FIG. 2 uses two-level compact titles. Therefore latest state summarizing or commonality of a cluster summarizing are used to create the titles. The timeline user interface process may require less top-level groups that the list-based process because the groups are shown vertically and scrolling might be undesired.

In one embodiment, the system 100 comprises a mobile communication device. The mobile communication device can be Internet enabled. Some of the applications of the device may include, but are not limited to, in addition to those described above, data acquisition (e.g. image, video and sound) and multimedia players (e.g. video and music players). In alternate embodiments, the system 100 can include other suitable devices and applications. The aspects of the disclosed embodiments are well suited for desktop but also non-desktop types of devices, such as for example mobile communication devices. Mobile communication devices typically have less screen space and different input methods than conventional desktop devices. Due to the limited screen space in mobile communication devices it is not always possible to represent more than one window simultaneously. Switching between windows can be difficult as well. The aspects of the disclosed embodiments provide a windowless navigation model that allows the user to perform multiple task in parallel without the need to use the desktop paradigms of windows and applications.

Referring to FIG. 1, in one embodiment, the user interface of the disclosed embodiments can be implemented on or in a device that includes a touch screen display, proximity screen device or other graphical user interface. This can allow the user to interact easily with the user interface for navigating in and among applications as described herein. In alternate embodiments, the aspects of the user interface disclosed herein could be embodied on any suitable device that will display information and allow the selection and activation of applications or system content. In one embodiment, the display 114 can be integral to the system 100. In alternate embodiments the display may be a peripheral display connected or coupled to the system 100. A pointing device, such as for example, a stylus, pen or simply the user's finger may be used with the display 114. In alternate embodiments, any suitable pointing device may be used. In other alternate embodiments, the display may be any suitable display, such as for example a flat display 114 that is typically made of a liquid crystal display (LCD) with optional back lighting, such as a thin film transistor (TFT) matrix capable of displaying color images.

The terms "select" and "touch" are generally described herein with respect to a touch screen-display. However, in alternate embodiments, the terms are intended to encompass the required user action with respect to other input devices. For example, with respect to a proximity screen device, it is not necessary for the user to make direct contact in order to select an object or other information. Thus, the above noted terms are intended to include that a user only needs to be within the proximity of the device to carry out the desired function.

Similarly, the scope of the intended devices is not limited to single touch or contact devices. Multi-touch devices, where contact by one or more fingers or other pointing devices can navigate on and about the screen, are also intended to be encompassed by the disclosed embodiments. Non-touch devices are also intended to be encompassed by the disclosed embodiments. Non-touch devices include, but are not limited to, devices without touch or proximity screens, where navigation on the display and menus of the various applications is performed through, for example, keys 110 of the system or through voice commands via voice recognition features of the system.

Figure 5A:
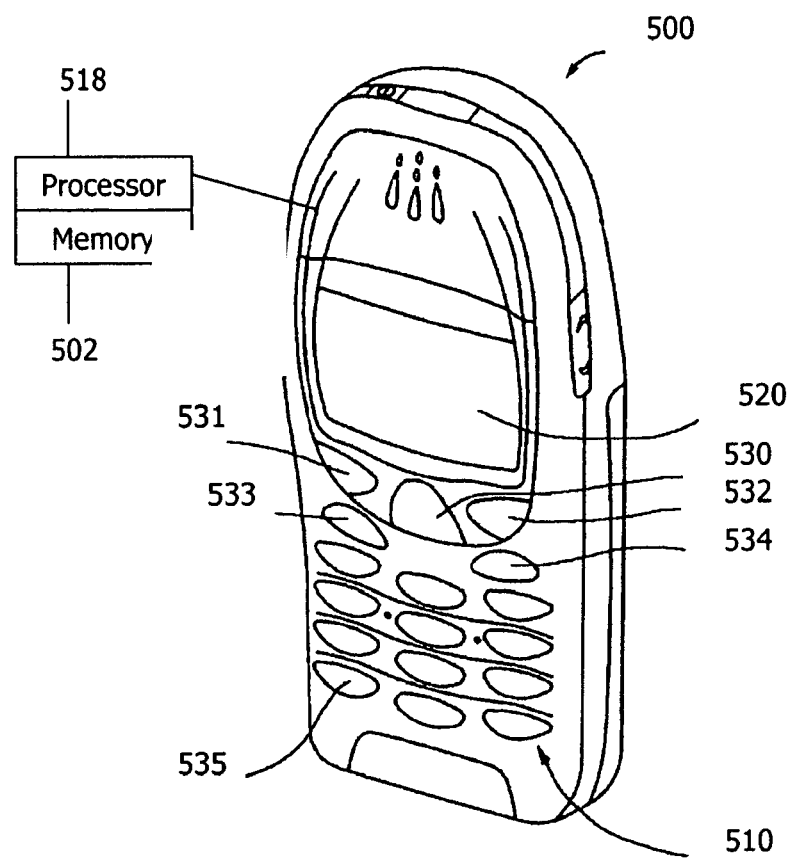
FIGS. 5A-5B are illustrations of exemplary devices that can be used to practice aspects of the disclosed embodiments.
Figure 5B:
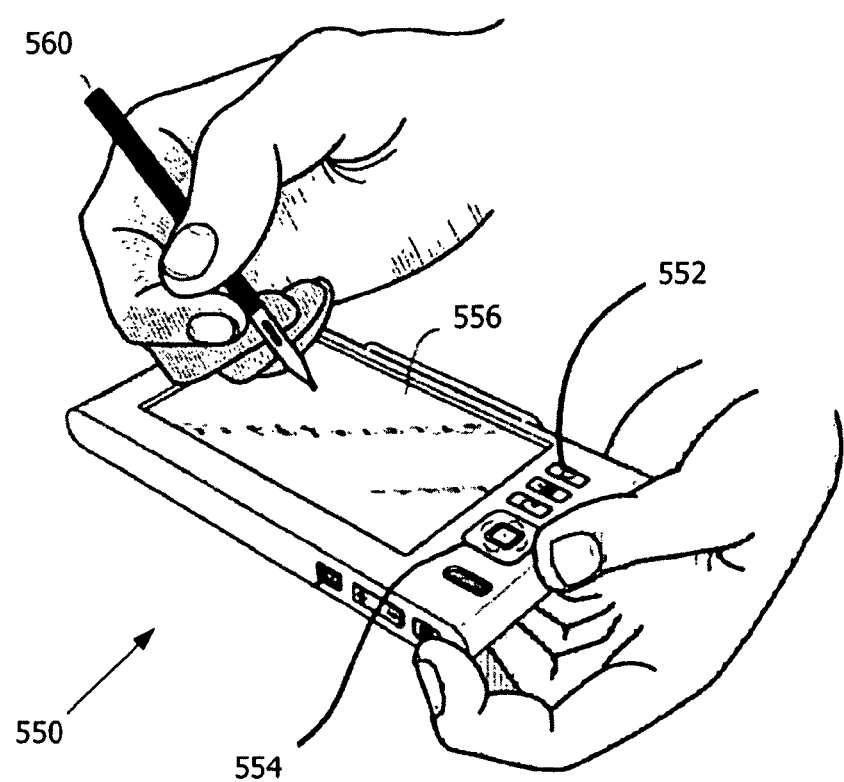

Some examples of devices on which aspects of the disclosed embodiments can be practiced are illustrated with respect to FIGS. 5A-5B. The devices are merely exemplary and are not intended to encompass all possible devices or all aspects of devices on which the disclosed embodiments can be practiced. The aspects of the disclosed embodiments can rely on very basic capabilities of devices and their user interface. Buttons or key inputs can be used for selecting the various selection criteria and links, and a scroll function can be used to move to and select item(s).

FIG. 5A illustrates one example of a device 500 that can be used to practice aspects of the disclosed embodiments. As shown in FIG. 5A, in one embodiment, the device 500 may have a keypad 510 as an input device and a display 520 for an output device. The keypad 510 may include any suitable user input devices such as, for example, a multi-function/scroll key 530, soft keys 531, 532, a call key 533, an end call key 534 and alphanumeric keys 535. In one embodiment, the device 500 can include an image capture device such as a camera (not shown) as a further input device. The display 520 may be any suitable display, such as for example, a touch screen display or graphical user interface. The display may be integral to the device 500 or the display may be a peripheral display connected or coupled to the device 500. A pointing device, such as for example, a stylus, pen or simply the user's finger may be used in conjunction with the display 520 for cursor movement, menu selection and other input and commands. In alternate embodiments any suitable pointing or touch device, or other navigation control may be used. In other alternate embodiments, the display may be a conventional display. The device 500 may also include other suitable features such as, for example a loud speaker, tactile feedback devices or connectivity port. The mobile communications device may have a processor 518 connected or coupled to the display for processing user inputs and displaying information on the display 520. A memory 502 may be connected to the processor 518 for storing any suitable information, data, settings and/or applications associated with the mobile communications device 500.

Although the above embodiments are described as being implemented on and with a mobile communication device, it will be understood that the disclosed embodiments can be practiced on any suitable device incorporating a processor, memory and supporting software or hardware. For example, the disclosed embodiments can be implemented on various types of music, gaming and multimedia devices. In one embodiment, the system 100 of FIG. 1 may be for example, a personal digital assistant (PDA) style device 550 illustrated in FIG. 5B. The personal digital assistant 550 may have a keypad 552, cursor control 554, a touch screen display 556, and a pointing device 560 for use on the touch screen display 556. In still other alternate embodiments, the device may be a personal computer, a tablet computer, touch pad device, Internet tablet, a laptop or desktop computer, a mobile terminal, a cellular/mobile phone, a multimedia device, a personal communicator, a television set top box, a digital video/versatile disk (DVD) or high definition player or any other suitable device capable of containing for example a display 114 shown in FIG. 1, and supported electronics such as the processor 518 and memory 502 of FIG. 5A. In one embodiment, these devices will be Internet enabled and include GPS and map capabilities and functions.

Figure 6:
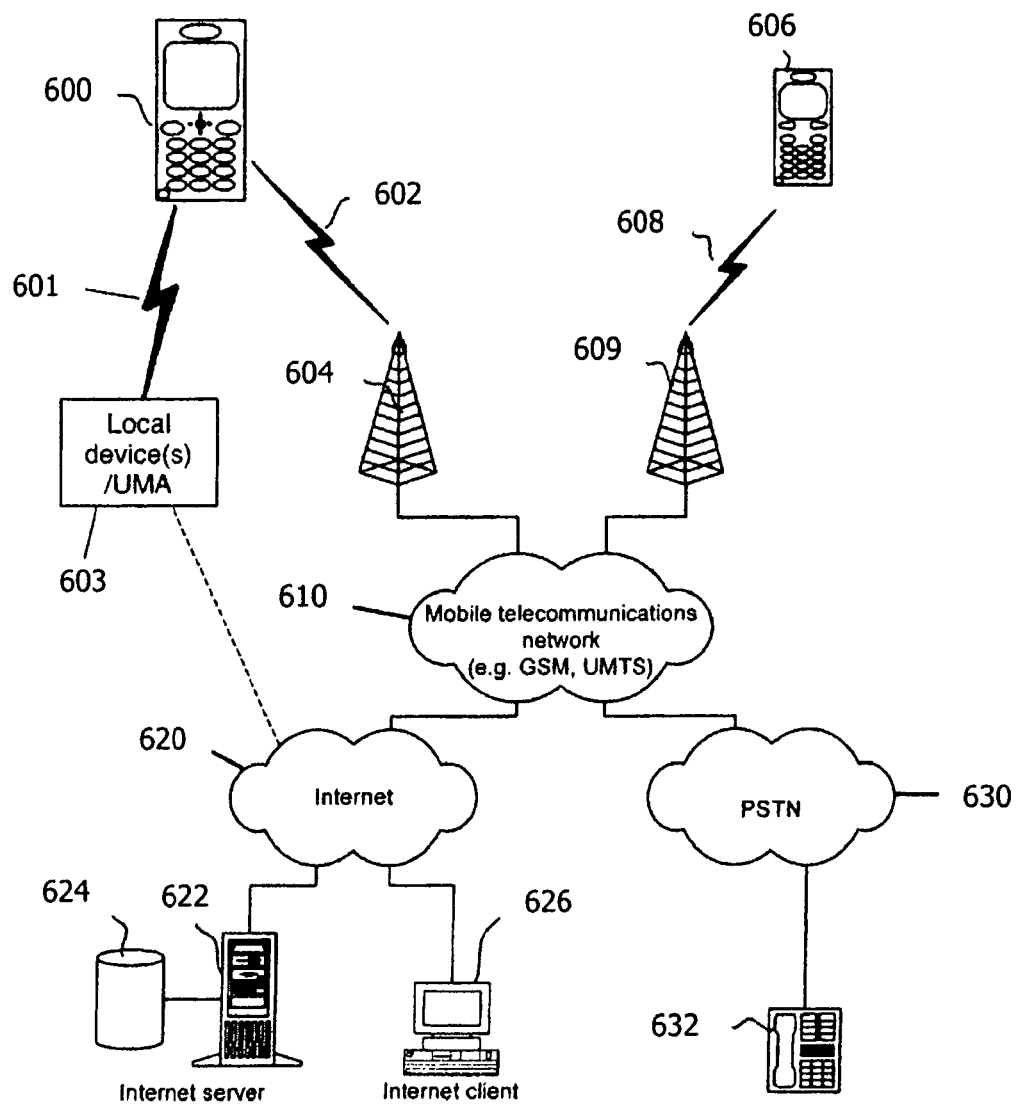
FIG. 6 illustrates a block diagram of an exemplary system incorporating features that may be used to practice aspects of the disclosed embodiments.

In the embodiment where the device 500 comprises a mobile communications device, the device can be adapted for communication in a telecommunication system, such as that shown in FIG. 6. In such a system, various telecommunications services such as cellular voice calls, worldwide web/wireless application protocol (www/wap) browsing, cellular video calls, data calls, facsimile transmissions, data transmissions, music transmissions, multimedia transmissions, still image transmission, video transmissions, electronic message transmissions and electronic commerce may be performed between the mobile terminal 600 and other devices, such as another mobile terminal 606, a line telephone 632, a personal computer (Internet client) 626 and/or an internet server 622.

It is to be noted that for different embodiments of the mobile device or terminal 600, and in different situations, some of the telecommunications services indicated above may or may not be available. The aspects of the disclosed embodiments are not limited to any particular set of services or communication, protocol or language in this respect.

The mobile terminals 600, 606 may be connected to a mobile telecommunications network 510 through radio frequency (RF) links 602, 608 via base stations 604, 609. The mobile telecommunications network 610 may be in compliance with any commercially available mobile telecommunications standard such as for example the global system for mobile communications (GSM), universal mobile telecommunication system (UMTS), digital advanced mobile phone service (D-AMPS), code division multiple access 2000 (CDMA2000), wideband code division multiple access (WCDMA), wireless local area network (WLAN), freedom of mobile multimedia access (FOMA) and time division-synchronous code division multiple access (TD-SCDMA).

The mobile telecommunications network 610 may be operatively connected to a wide-area network 620, which may be the Internet or a part thereof. Internet server 622 has data storage 624 and is connected to the wide area network 620. The server 622 may host a worldwide web/wireless application protocol server capable of serving worldwide web/wireless application protocol content to the mobile terminal 600. The mobile terminal 600 can also be coupled to the Internet 620. In one embodiment, the mobile terminal 600 can be coupled to the Internet 620 via a wired or wireless link, such as a Universal Serial Bus (USB) or Bluetooth™ connection, for example.

A public switched telephone network (PSTN) 630 may be connected to the mobile telecommunications network 610 in a familiar manner. Various telephone terminals, including the stationary telephone 632, may be connected to the public switched telephone network 630.

The mobile terminal 600 is also capable of communicating locally via a local link 601 to one or more local devices 603. The local links 601 may be any suitable type of link or piconet with a limited range, such as for example Bluetooth™, a USB link, a wireless Universal Serial Bus (WUSB) link, an IEEE 802.11 wireless local area network (WLAN) link, an RS-232 serial link, etc. The local devices 603 can, for example, be various sensors that can communicate measurement values or other signals to the mobile terminal 600 over the local link 601. The above examples are not intended to be limiting, and any suitable type of link or short range communication protocol may be utilized. The local devices 603 may be antennas and supporting equipment forming a wireless local area network implementing Worldwide Interoperability for Microwave Access (WiMAX, IEEE 802.16), WiFi (IEEE 802.11x) or other communication protocols. The wireless local area network may be connected to the Internet. The mobile terminal 600 may thus have multi-radio capability for connecting wirelessly using mobile communications network 610, wireless local area network or both. Communication with the mobile telecommunications network 610 may also be implemented using WiFi, Worldwide Interoperability for Microwave Access, or any other suitable protocols, and such communication may utilize unlicensed portions of the radio spectrum (e.g. unlicensed mobile access (UMA)). In one embodiment, the navigation module 122 of FIG. 1 includes communication module 134 that is configured to interact with, and communicate with, the system described with respect to FIG. 6.

Figure 7:
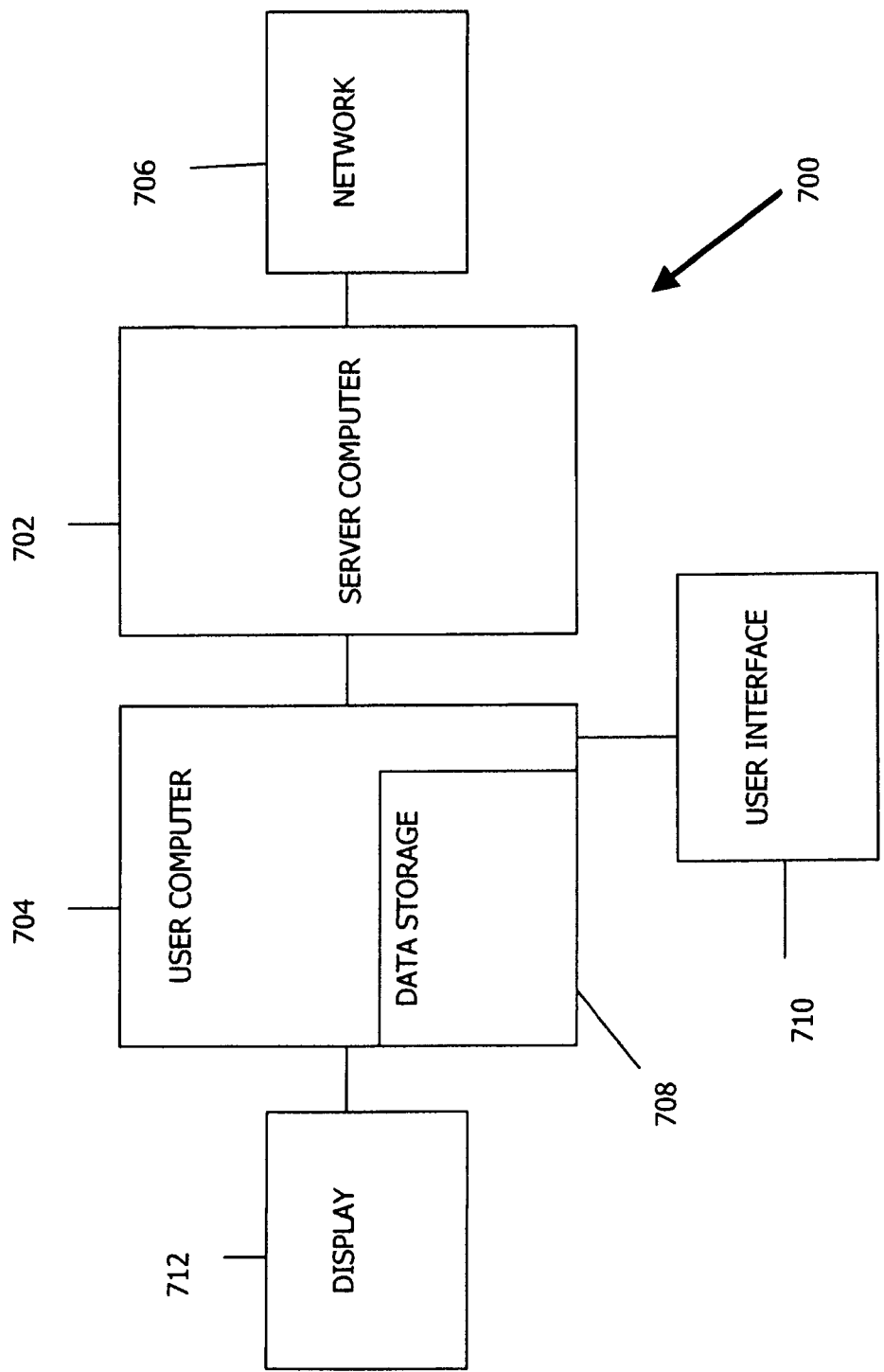
FIG. 7 is a block diagram illustrating the general architecture of an exemplary system in which the devices of FIGS. 5A and 5B may be used.

The disclosed embodiments may also include software and computer programs incorporating the process steps and instructions described above. In one embodiment, the programs incorporating the process steps described herein can be executed in one or more computers. FIG. 7 is a block diagram of one embodiment of a typical apparatus 700 incorporating features that may be used to practice aspects of the invention. The apparatus 700 can include computer readable program code means for carrying out and executing the process steps described herein. In one embodiment the computer readable program code is stored in a memory of the device. In alternate embodiments the computer readable program code can be stored in memory or memory medium that is external to, or remote from, the apparatus 700. The memory can be direct coupled or wireless coupled to the apparatus 700. As shown, a computer system 702 may be linked to another computer system 704, such that the computers 702 and 704 are capable of sending information to each other and receiving information from each other. In one embodiment, computer system 702 could include a server computer adapted to communicate with a network 706. Alternatively, where only one computer system is used, such as computer 704, computer 704 will be configured to communicate with and interact with the network 706. Computer systems 702 and 704 can be linked together in any conventional manner including, for example, a modem, wireless, hard wire connection, or fiber optic link. Generally, information can be made available to both computer systems 702 and 704 using a communication protocol typically sent over a communication channel or other suitable connection or line, communication channel or link. In one embodiment, the communication channel comprises a suitable broad-band communication channel. Computers 702 and 704 are generally adapted to utilize program storage devices embodying machine-readable program source code, which is adapted to cause the computers 702 and 704 to perform the method steps and processes disclosed herein. The program storage devices incorporating aspects of the disclosed embodiments may be devised, made and used as a component of a machine utilizing optics, magnetic properties and/or electronics to perform the procedures and methods disclosed herein. In alternate embodiments, the program storage devices may include magnetic media, such as a diskette, disk, memory stick or computer hard drive, which is readable and executable by a computer. In other alternate embodiments, the program storage devices could include optical disks, read-only-memory ("ROM") floppy disks and semiconductor materials and chips.

Computer systems 702 and 704 may also include a microprocessor for executing stored programs. Computer 702 may include a data storage device 708 on its program storage device for the storage of information and data. The computer program or software incorporating the processes and method steps incorporating aspects of the disclosed embodiments may be stored in one or more computers 702 and 704 on an otherwise conventional program storage device. In one embodiment, computers 702 and 704 may include a user interface 710, and/or a display interface 712 from which aspects of the invention can be accessed. The user interface 710 and the display interface 712, which in one embodiment can comprise a single interface, can be adapted to allow the input of queries and commands to the system, as well as present the results of the commands and queries, as described with reference to FIG. 1, for example.

The aspects of the disclosed embodiments provide for user multitasking in a windowless user interface. Multiple tasks can be performed without the need for desktop paradigms of windows and applications. Unsupervised machine learning methods are used to cluster a set of discrete user interface states into user-perceived tasks. The task can then be presented, using for example two or more hierarchical levels, and the user can return to any of the tasks. In this way, the user does not have to manage windows. The tasks are formed automatically by the system based on the user's behavior. The aspects of the disclosed embodiments allow a user to return to either the latest state of each task or any state within each task. The aspects of the disclosed embodiments are extensible, and can work for a system that can be extended by 3.sup.rd parties with new services, data, applications and user interfaces, for example.

It is noted that the embodiments described herein can be used individually or in any combination thereof. It should be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

What is claimed is:

1. A method comprising:
   clustering, with a processor, a set of discrete user interface states into groups, wherein each group is associated with a respective user interface, wherein the set comprises at least a first user interface state of a particular user interface and a second user interface state of the particular user interface, and wherein a view of the particular user interface in the first user interface state is different from a view of the particular user interface in the second user interface state;
   causing display of the groups;
   receiving selection of a user interface state; and
   following selection of the user interface state, causing a current user interface state to change to the user interface state.

2. The method of claim 1 wherein the clustering of the user interface states further comprises using unsupervised machine learning methods to process and sort the user interface states.

3. The method of claim 2 further comprising that the unsupervised machine learning is Hierarchical Agglomerative Clustering.

4. The method of claim 2 further comprising that the unsupervised machine learning is Bisecting K-Means Clustering.

5. The method of claim 1 wherein causing the display of the groups further comprises causing the groups to display in a hierarchical view with two or more hierarchical levels, each group being expandable to show user interface states within the group.

6. The method of claim 5 further comprising that a group title is on a first level and the user interface states of the group are on a second level.

7. The method of claim 5 wherein the causing display of the groups further comprises causing the display of the groups and the group titles in a list view where the first and second levels are arranged vertically, such that the user interface states are listed underneath each group title.

8. The method of claim 1 wherein the causing the display of the groups further comprises causing the display of the groups graphically on a timeline, at least one group being expandable to show user interface states within the group.

9. The method of claim 8 wherein the causing display of the groups further comprises causing the display of the first and second levels horizontally, such that the group title is on a side of a display and the user interface states are presented along a timeline, based on time of recording in a state history.

10. The method of claim 1 further comprising, prior to causing the display of the groups:
    filtering to remove duplicate user interface states so that only a most recent user interface state is kept;
    sorting the user interface states in a state history based on time of recording, so that the most recent user interface state is first and the least recent user interface state is last; and
    summarizing to identify each group with a group title.

11. The method of claim 10 wherein the groups are summarized based on the most recent user interface state, or similarities exhibited by the user interface states within the group.

12. The method of claim 1 further comprising that the groups and their presentation are altered as new user interface states are recorded in a state history and clustered.

13. A computer program product stored in a memory comprising computer readable program code that, when executed by a processor, performs:
    clustering, with a processor, a set of discrete user interface states into groups, wherein each group is associated with a respective user interface, wherein the set comprises at least a first user interface state of a particular user interface and a second user interface state of the particular user interface, and wherein a view of the particular user interface in the first user interface state is different from a view of the particular user interface in the second user interface state;
    causing display of the groups;
    receiving selection of a user interface state; and following selection of the user interface state, causing a current user interface state to change to the user interface.

14. An apparatus comprising at least one processor and at least one memory including computer program code, the at least one memory and the computer program code configured to, with the processor, cause the apparatus to at least:
cluster a set of discrete user interface states into groups, wherein each group is associated with a respective user interface, wherein the set comprises at least a first user interface state of a particular user interface and a second user interface state of the particular user interface, and wherein a view of the particular user interface in the first user interface state is different from a view of the particular user interface in the second user interface state;
cause display of the groups;
receive selection of a user interface state; and
following selection of the user interface state, cause a current user interface state to change to the user interface state.

15. The apparatus of claim 14, wherein the at least one memory and the computer program code are further configured to create a link to a user interface state.

16. The apparatus of claim 14, wherein the at least one memory and the computer program code are further configured to use unsupervised machine learning methods.

17. The apparatus of claim 14, wherein the at least one memory and the computer program code are further configured to filter, sort and summarize the user interface groups.

18. The apparatus of claim 17 wherein the filtering comprises filtering to remove duplicate user interface states so that only a most recent user interface state is kept.

19. The method of claim 1, wherein the causing display of the groups comprises causing display of objects representing corresponding user interface states, and the receiving selection of the user interface state comprises receiving selection of at least one of the objects representing the user interface state.

20. The apparatus of claim 14, wherein the causation of display of the groups comprises causation of display of objects representing corresponding user interface states, and the receipt of selection of the user interface state comprises receipt of selection of at least one of the objects representing the user interface state.

* * * * *